Feb. 28, 1967 P. E. ANGLIN 3,306,067
AUTOMOTIVE VEHICLE AIR CONDITIONING SYSTEM
Filed Dec. 21, 1965 2 Sheets-Sheet 1

INVENTOR.
PAUL E. ANGLIN,
BY
Berman, Davidson & Berman
ATTORNEYS.

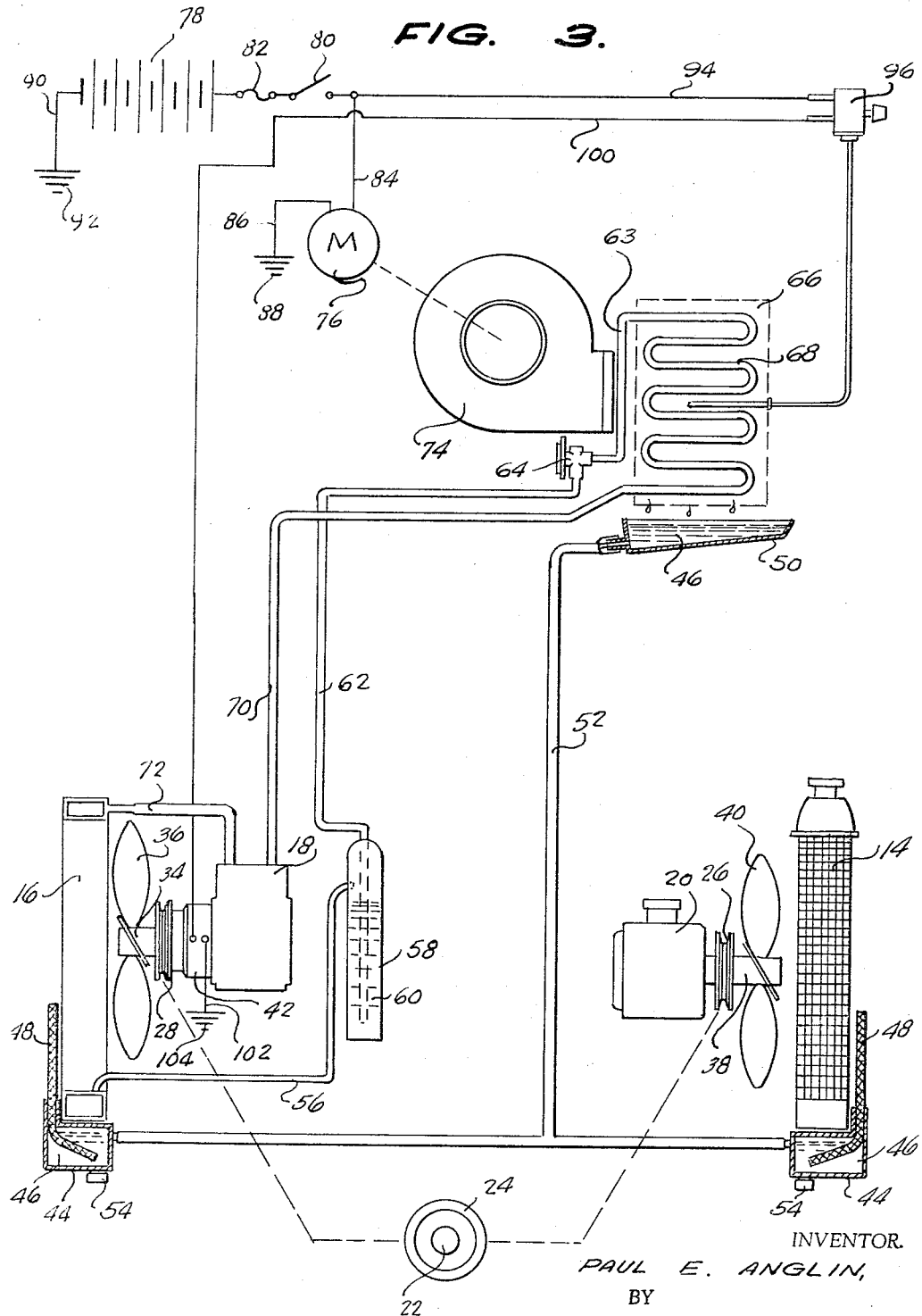

United States Patent Office 3,306,067
Patented Feb. 28, 1967

3,306,067
AUTOMOTIVE VEHICLE AIR
CONDITIONING SYSTEM
Paul E. Anglin, 3333 E. Kiest Blvd., Dallas, Tex. 75203
Filed Dec. 21, 1965, Ser. No. 515,332
8 Claims. (Cl. 62—243)

This invention relates to an automotive vehicle air conditioning system and, more particularly, an automotive vehicle air conditioning system characterized by increased efficiency and effectiveness.

In the conventional automotive vehicle air conditioning system, the condenser is normally mounted in front of the radiator due to space considerations. Placing the condenser in this position impairs air circulation through the radiator while the heat dissipated by the condenser retards the water cooling in the radiator.

Thus, automotive vehicles equipped with air conditioning systems have been subject to increased incidence of overheating. This is usually acute during engine idling conditions, when the engine radiator fan must be relied upon exclusively to pull air past the condenser. Not only is the refrigerant in the condenser poorly cooled, the engine cooling system suffers as well, since the condenser blocks the radiator.

Accordingly, it is an object of this invention to provide an improved air conditioning system for an automotive vehicle.

A further object of this invention is to provide an improved air conditioning system for an automotive vehicle wherein the condenser of the air conditioning system and the radiator of the engine cooling system are disposed in side by side juxtaposition, thereby enabling air to circulate freely past both components, rendering their operation normal and at optimum efficiency.

A still further object of this invention is to provide an automotive vehicle air conditioning system of the character indicated wherein the side by side, juxtaposition of the condenser of the air conditioning system and the radiator carrying engine coolant, eliminates radiation between the components, thereby providing a more efficient cooling system for the engine and the air conditioner.

Still another object of this invention is to provide an air conditioning system for an automotive vehicle wherein the side by side, juxtaposition of the engine coolant carrying radiator and condenser of the air conditioning system enable the provision of separate, engine driven fans for drawing air past each component which results in maximum cooling of each component.

Yet another object of this invention resides in the use of separate, engine driven fans for the radiator and condenser, therein enabling the separate condenser fan to be rendered operable only when the air conditioning system is rendered operable, and thus reducing the horsepower drag on the engine of the automotive vehicle, resulting in a decrease of gasoline consumption by the air conditioned vehicle.

Another object of this invention is the provision of an automobile air conditioning system using a radiator design found to be the most economical and efficient, since the side by side juxtaposition of the condenser and radiator results in a tall and narrow radiator, thereby reducing the number of soldered joints in the fabrication of the same, and thus reducing the cost of this component substantially.

Another object of this invention is the provision of an automovile air conditioning system which requires a relatively small space beneath the hood of the automotive vehicle thereby meeting modern trends in automotive vehicle design.

Still another object of this invention is to provide an improved automobile air conditioning system wherein the condensate from the evaporator is used to achieve additional cooling of the condenser.

Further objects and advantages of the invention will become apparent from the following description and claims, and from the accompanying drawings, wherein:

FIGURE 3 is a schematic diagram illustrating the operation of the automobile air conditioning system of the present invention.

Figure 1:
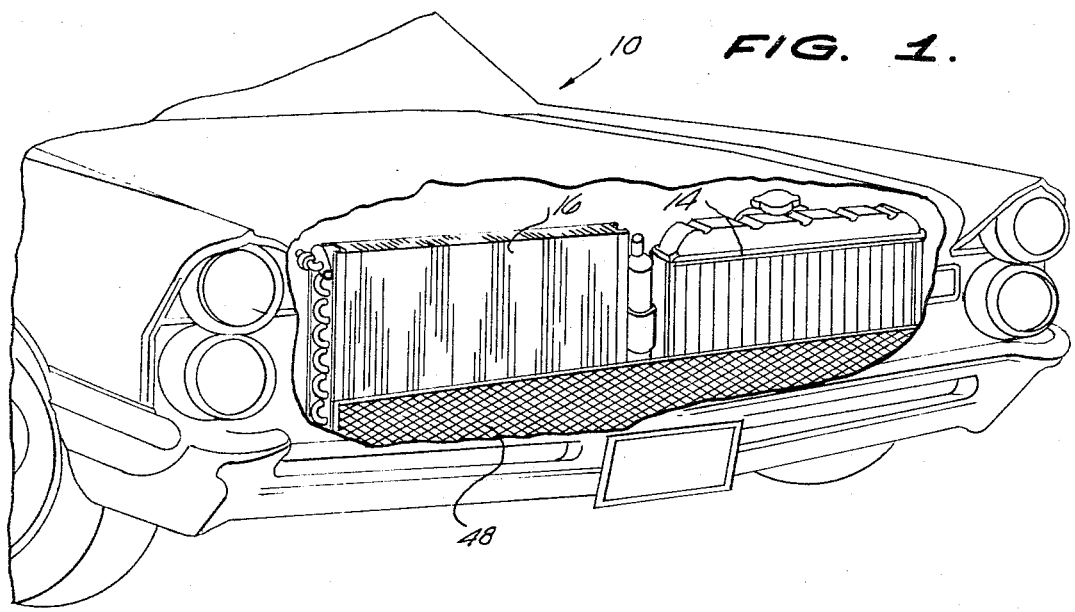
FIGURE 1 is a fragmentary perspective view of an automotive vehicle equipped with an automotive vehicle air conditioning system as per the instant invention, with portions broken away to illustrate various details of said system.

Referring now to the drawings in detail, wherein like numerals indicate like elements, an automotive vehicle generally designated by the numeral 10 is illustrated which is equipped with an automotive vehicle air conditioning system constructed in accordance with the principles of the present invention.

The automobile vehicle 10 includes the conventional internal combustion engine 12 for propelling the vehicle. A conventional radiator 14 is provided in front of the engine 12 for cooling an engine coolant heated by the engine. Mounted in side by side juxtaposition to the radiator 14 is the refrigerant condenser 16 of the air conditioning system.

Figure 2:
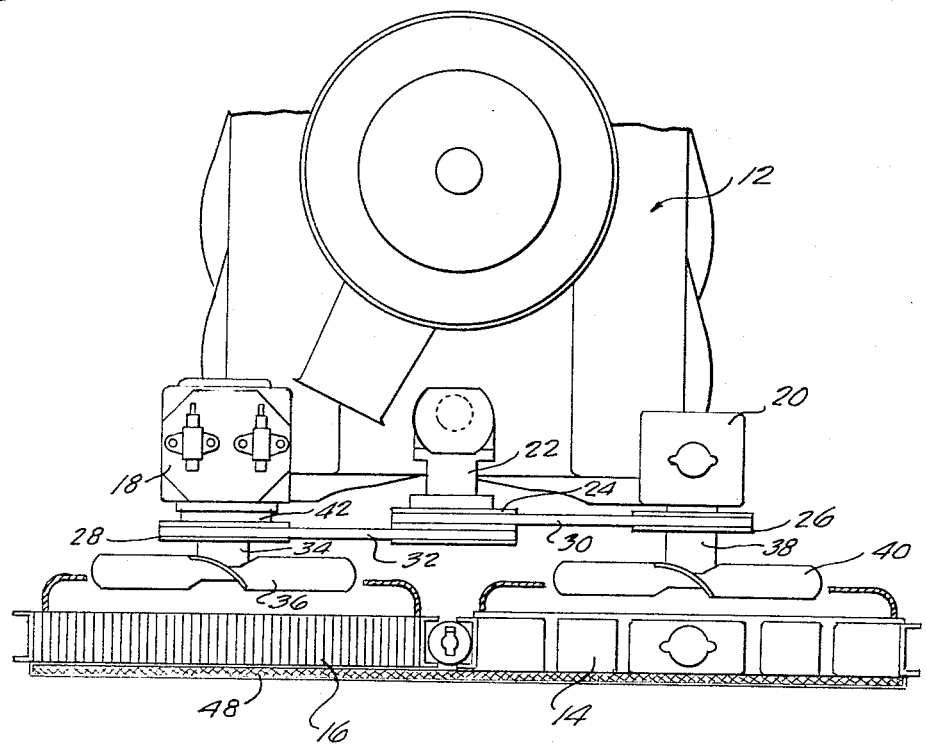
FIGURE 2 is a fragmentary top plan view illustrating various components of the air conditioning system disposed beneath the hood of the automotive vehicle illustrated in FIGURE 1.

As shown in FIGURE 2, the condenser is mounted in front of the air conditioning compressor 18, while the radiator 14 is mounted in front of the power steering unit 20 of the automotive vehicle 10. Separate, engine driven fans 36 and 40 are provided for drawing air through the grille of the automotive vehicle 10, past the condenser 16 and radiator 14, respectively.

Fixed to the crankshaft 22 of the engine 12 is a double pulley 24. Belts 30 and 32 extend laterally from the pulley 24 in opposite directions.

The input shaft 38 of the power steering pump carries the fan 40 and is also provided with a pulley 26 receiving the belt 30, establishing a driving connection between the engine crankshaft 22 and the fan 40. The belt 32 is received by a pulley 28 fixed to a conventional electromagnetic clutch 42. Electromagnetic clutch 42 is mounted on the compressor input shaft 34 and couples the compressor input shaft and fan 36 through the pulley 28 and belt 32 to the crankshaft 22, thus establishing, when activated, a driving connection between the engine and the condenser fan 26.

Referring specifically to FIGURE 3, the operation of the automotive vehicle air conditioning system of the present invention will become readily apparent.

Refrigerant vapor at high pressure and temperature leaves the compressor 18 through conduit 72 and enters the condenser 16 where heat is taken from the refrigerant and condensation occurs at high pressure. The operation of the fan 36 enables air to freely circulate and be drawn past the condenser plates for cooling.

Liquid refrigerant 60 leaves the condenser 16 through a conduit 56 and is stored temporarily in a refrigerant receiver 58 which serves no thermodynamic purpose. From the receiver 58, the liquid refrigerant 60 is conducted through conduit 62 to an expansion valve 64 located at the entrance to the refrigerating coils 68 of an evaporator 66 disposed within the passenger compartment of the automotive vehicle 10. As customary, a pressure reduction then takes place at the expansion valve 64, with a reduced boiling point as a consequence, and part of the liquid refrigerant 60 is immediately vaporized, so that the state of the refrigerant upon leaving the expansion valve 64 is that of a vapor of low quality at a temperature corresponding to its low pressure. Upon entering the evaporator 66 through conduit 63, the vapor, being at a temperature below that of the evaporator coils 68, absorbs heat from the ambient air surrounding the coils for its further vaporization. The refrigerant vapor finally leaves the evaporator coils 68 and returns through conduit 70 to the compressor 18 where the pressure is again increased and the cycle repeated.

The evaporator unit is disposed within the passenger compartment of the automobile 10. A blower 74, operated by a motor 76 is provided to blow cool air into the passenger compartment by directing a stream of air past the evaporator coils 68. The refrigerant receiver 58, expansion valve 64 and the various conduits are located in a convenient manner in the space beneath the hood of the automotive vehicle.

The electrical components of the air conditioning system are operated from the vehicle battery 78. The battery 78 is grounded at 92 through an electrical conduit 90. The positive side of the battery is connected through a fuse 82 to the main air conditioner switch 80, located in the passenger compartment, and through electrical conduit 84 to the electric motor 76 which is grounded at 88 by an electrical conduit 86 to complete the circuit for operating the blower 74 upon closing of the air conditioner switch 80.

The main air conditioner switch 80 is also in electrical series with a thermostat 96 having a temperature determining element within the evaporator unit 66. The thermostat 96, also preferably positioned in the passenger compartment, is connected by an electrical conduit 100 to the electromagnetic clutch 42 which in turn is grounded at 104 through an electrical conductor 102, thereby completing a series circuit through the thermostat to the automotive vehicle battery 78.

The fan 36 is rendered operative only upon rendering the air conditioning system operative by means of closing the switch 80. The closing of the switch 80 will cause activation through the thermostat 96 of the electromagnetic clutch 42 and, hence, operation of compressor 18 and fan 36. This is accomplished by establishing a circuit from the battery 78, fuse 82, through switch 80, electrical conduit 94, thermostat 96, electrical conduit 100 through the clutch 42, electrical conduit 102, and thence back to ground at 104. If the thermostat 96 renders the air conditioning system inoperative, this will open the circuit from the battery 78 to the electromagnetic clutch 42, rendering the fan 36 and compressor 18 inoperative.

The operation of the condenser fan 36 only upon operation of the air conditioning system will, of course, decrease the horsepower drag on the engine at 22 and require less power for normal operation, thereby decreasing gas consumption.

The side by side, juxtaposition of the condenser 16 and radiator 14 in the air conditioning system enables air to be freely drawn through the grille by the corresponding radiator condenser fans and maximum surface area of the radiator and condenser elements are exposed to the drawn air for maximum cooling. This reduces the chance of the radiator 14 overheating which finds high incidence in conventional air conditioning systems because of the blockage of the radiator by the condenser in the path of air flow. Furthermore, the side by side juxtaposition of the radiator 14 and condenser 16 eliminates heat radiation between these elements, thereby making the air conditioning system more effective as well as making the engine cooling system more effective.

It has also been discovered that the air conditioning efficiency and engine cooling rate can be increased approximately ten to fifteen percent by employing the condensate 46 of the evaporator unit 66.

A pan 50 can be provided beneath the evaporator coils 68 for collecting the condensate 46, which can then flow by gravity through a conduit 52 to a trough 44 disposed beneath the side by side, juxtaposed radiator 14 and condenser 16.

Extending upwardly from the trough 44 is a urethane block 48 or other fungus resistant material, subject to capillary action. The condensate 46 within the trough 44 saturates the block 48 by capillary action. The condensate 48 can then evaporate in front of the condenser and radiator to provide increased cooling of these components, thus increasing the efficiency of both the automobile air conditioning system and the engine cooling system.

As shown in FIGURES 1 and 2, the block 48 extends the full width of the juxtaposed radiator and condenser and encompasses about one-third of their height. A drain plug 54 is also provided in the trough 44 for emptying its contents, when desired.

It should also be understood that while the radiator fan 40 is shown mounted upon the input shaft of the power steering pump, any other accessible element could be provided with a shaft for mounting the fan and a pulley.

While a specific embodiment of an improved automobile air conditioning system has been disclosed in the foregoing description, it will be understood that various modifications within the spirit of the invention may occur to those skilled in the art. Therefore, it is intended that no limitations be placed on the invention except as defined by the scope of the appended claims.

I claim:
1. In an automotive vehicle including a compartment to be cooled and an engine for propelling the vehicle, a radiator for cooling engine coolant heated by said engine, and an air conditioning system for providing cool air in said compartment, said air conditioning system including a refrigerant condenser in substantially side by side, juxtaposition to said radiator.

2. In an automotive vehicle in accordance with claim 1, a first engine driven fan for drawing air through said radiator between said engine and radiator, and a second engine driven fan for drawing air through said air conditioning system condenser between said engine and condenser.

3. In an automotive vehicle in accordance with claim 2, means for disengaging said second fan from said engine drive in response to said air conditioning system being rendered inoperative.

4. In an automotive vehicle in accordance with claim 3 wherein said air conditioning system includes a compressor having an input shaft, said second engine driven fan being mounted upon said compressor input shaft, and said last-named means including a clutch on said shaft.

5. In an automotive vehicle in accordance with claim 1 wherein said air conditioning system includes an evaporator within said compartment, means beneath said side by side, radiator and condenser for collecting condensate from said evaporator, and means in communication with said collection means for disposing said condensate in front of said radiator and condenser.

6. In an automotive vehicle in accordance with claim 5 wherein said last-named means includes a liquid saturable element extending upwardly from said collection means along the width of said side by side radiator and condenser.

7. In an automotive vehicle in accordance with claim 4 wherein said air conditioning system includes an evaporator within said compartment, means beneath said side by side, radiator and condenser for collecting condensate from said evaporator and means in communication with said collection means for disposing said condensate in front of said radiator and condenser.

8. In an automotive vehicle in acordance with claim 7 wherein said last-named means includes a liquid saturable element extending upwardly from said collection means along the width of said side by side, radiator and condenser.

References Cited by the Examiner

UNITED STATES PATENTS 2,774,220   12/1956   Heym _____ 62—243
2,789,794   4/1957    Moore _____ 62—243

WILLIAM J. WYE, *Primary Examiner.*